E. P. PULLIAM.
Gang-Plow.

No. 165,866.  Patented July 20, 1875.

WITNESSES:
C. Neveux
A. F. Terry

INVENTOR:
Eugene P. Pulliam
BY
[signature]
ATTORNEYS.

UNITED STATES PATENT OFFICE.

EUGENE P. PULLIAM, OF PALMYRA, MISSOURI.

IMPROVEMENT IN GANG-PLOWS.

Specification forming part of Letters Patent No. 165,866, dated July 20, 1875; application filed February 20, 1875.

*To all whom it may concern:*

Figure 1:
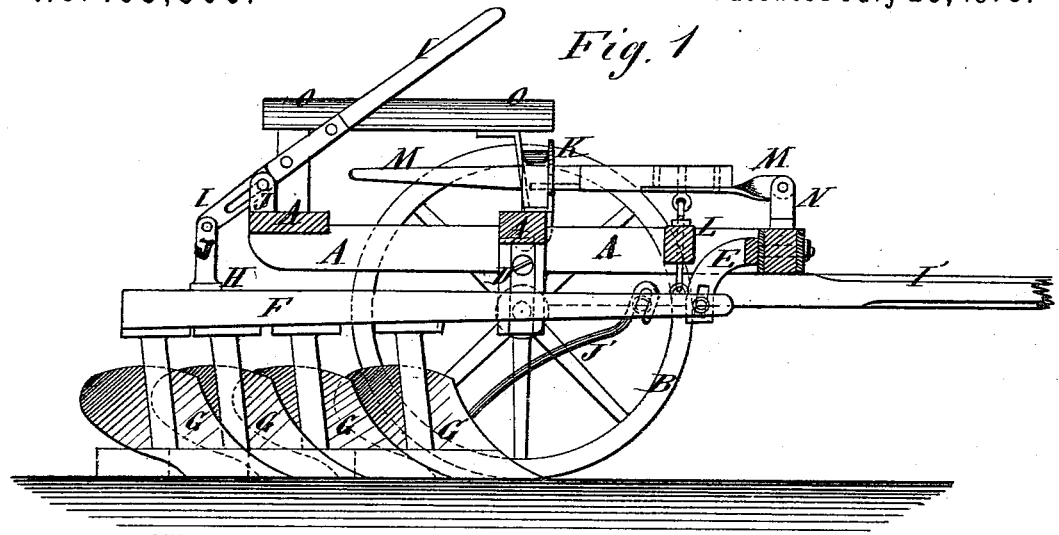
Figure 2:
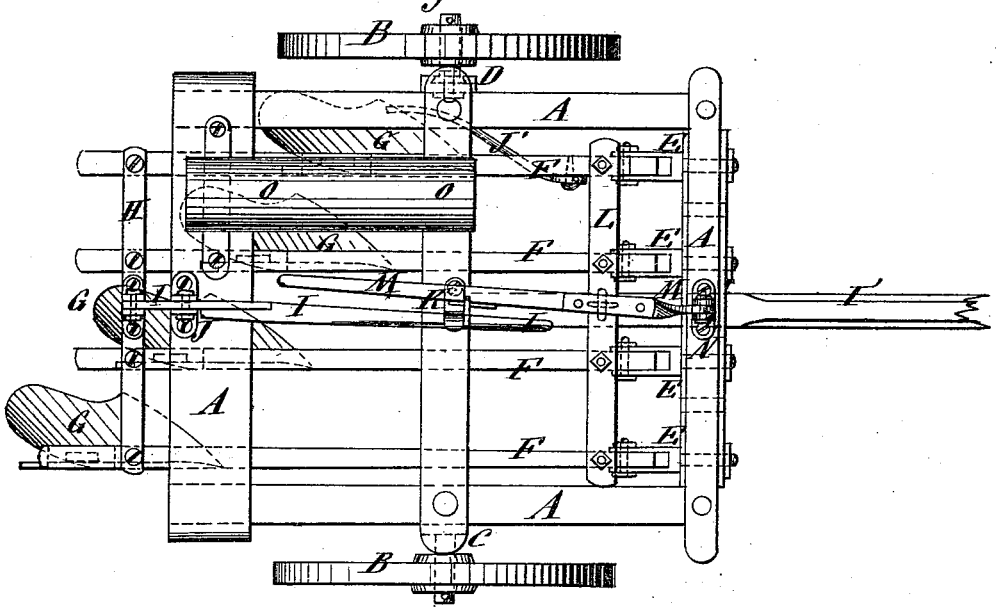
Figure 3:
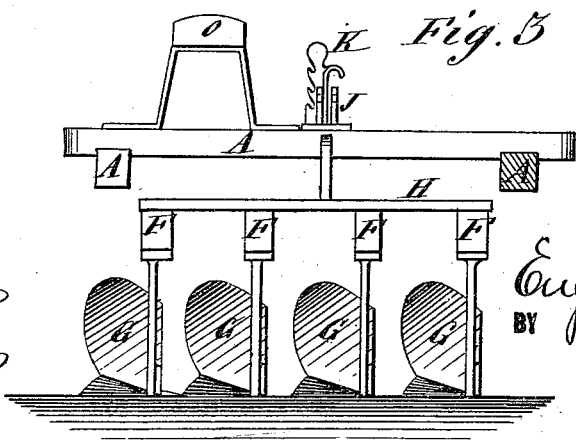

Be it known that I, EUGENE P. PULLIAM, of Palmyra, in the county of Marion and State of Missouri, have invented a new and useful Improvement in Gang-Plows, of which the following is a specification:

Figure 1 is a vertical longitudinal section of my improved machine arranged as a gang-plow. Fig. 2 is a top view of the same. Fig. 3 is a rear view of the same.

The invention will first be described in connection with drawing, and then pointed out in the claim.

A is a rectangular frame. B are the wheels, which revolve upon the journals of the crank-axles C D. The crank-axle C is rigidly attached to the side of the frame A. The shank of the crank-axle D slides up and down in a groove in a plate attached to the frame A, and is slotted to receive the bolt by which it is secured to said plate, so that the wheel may be adjusted to cause the machine to run level, whether the said wheel be running upon the surface of the ground or in a furrow. The front cross-bar of the frame A is strengthened by iron plates attached to its front and rear sides. Through the front cross-bar of the frame A and its plates are formed a number of holes to receive the curved arms E, which are secured in place by nuts screwed upon their forward ends. The lower parts of the curved arms E have wide slots formed in them to receive the forward ends of the plow-beams F, which are pivoted to said arms by bolts passing through holes in the beams F, and through narrow slots in the said curved arms E, so that the forward ends of the plow-beams may be raised and lowered to cause the plows to work shallower or deeper in the ground, as may be required. G are the plows, which are attached to the beams F, the one a little in advance of the other, so that each forward plow may be out of the way of the furrow turned by each following plow. The rear parts of the plow-beams F are connected and held in their proper relative positions by a cross-bar, H. To the center of the cross-bar H, or to a short stud attached to said cross-bar, is pivoted the end of the lever I, which is pivoted to a slotted stud, J, attached to the rear cross-bar of the frame A by a bolt that passes through a hole in the said stud and through a slot in the said lever, so that the said lever may adjust itself as it is operated to raise and lower the plows. The forward end of the lever I, when lowered to raise the plows from the ground, is held in place by a catch-bar, K, attached to the central cross-bar of the frame A. L is a cross-bar or yoke, which is connected with the forward ends of the plow-beams F by eye-bolts or other jointed connections, and to the center of which is pivoted a lever, M. The forward end of the lever M is pivoted to a stud, N, attached to the forward cross-bar of the frame A, and its rear end projects back and is so formed as to catch upon the teeth of the catch-bar K, attached to the central cross-bar of the frame A. The levers M I enable the plows to be adjusted to work at any desired depth in the ground, or to be raised away from the ground, as desired. O is the driver's seat, which is placed upon the left-hand side of the levers M I, and the standards of which are attached to the central and rear cross-bars of the frame A.

Having thus described my invention, I claim as new and desire to secure by Letters Patent—

The combination of the series of gang-plow beams F, rigid rear bar H, pivoted front bar L, and slotted socket-arms E, as shown and described, to enable the altitude of all the beams to be simultaneously regulated, in the manner set forth.

EUGENE P. PULLIAM.

Witnesses:
 AUGUST POLLMAN,
 CONRAD STUHLMANN.